(12) United States Patent
Saito et al.

(10) Patent No.: US 6,808,688 B1
(45) Date of Patent: Oct. 26, 2004

(54) PARTICULATE TRAP FOR DIESEL ENGINE

(75) Inventors: Hidetoshi Saito, Itami (JP); Masataka Oji, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 920 days.

(21) Appl. No.: 09/597,558

(22) Filed: Jun. 20, 2000

(30) Foreign Application Priority Data

Jun. 29, 1999 (JP) ............................................. 11-182796
Feb. 29, 2000 (JP) ....................................... 2000-053569

(51) Int. Cl.[7] ............................................. B01D 53/34
(52) U.S. Cl. ...................... 422/177; 422/171; 422/180; 422/181; 55/DIG. 30
(58) Field of Search ............................. 422/170–171, 422/177, 180, 181; 60/301, 311; 55/DIG. 10, DIG. 30

(56) References Cited

U.S. PATENT DOCUMENTS

| | | | | |
|---|---|---|---|---|
| 3,960,528 A | * | 6/1976 | Jacobs et al. | 55/DIG. 30 |
| 4,677,823 A | * | 7/1987 | Hardy | 60/274 |
| 4,902,487 A | | 2/1990 | Cooper et al. | 422/171 |
| 5,458,664 A | | 10/1995 | Ishii et al. | |
| 5,758,496 A | | 6/1998 | Rao et al. | |
| 5,830,415 A | | 11/1998 | Maeda et al. | 422/171 |
| 5,961,931 A | * | 10/1999 | Ban et al. | 422/171 |

FOREIGN PATENT DOCUMENTS

| | | | |
|---|---|---|---|
| EP | 0 835 684 | | 4/1998 |
| EP | 849444 | * | 6/1998 |
| EP | 0 900 922 | | 3/1999 |
| EP | 0 835 684 | | 6/1999 |
| EP | 0 957 241 | | 11/1999 |
| JP | 5-049942 | | 3/1993 |
| JP | 6-257422 | | 9/1994 |
| JP | 10-159552 | | 6/1998 |

* cited by examiner

Primary Examiner—Hien Tran
(74) Attorney, Agent, or Firm—McDermott Will & Emery LLP

(57) ABSTRACT

A particulate trap that burns and removes particulate matters (particles, consisting mainly of carbon particles, contained in the exhaust gas of a diesel engine of a car) trapped by a filter without using a specifically provided heat source such as a burner or an electric heater even when the car is running in ordinary urban areas, i.e., when the exhaust gas is low in temperature. In the particulate trap, a catalytic converter 3, formed of a metallic porous body having a three-dimensional network structure, carrying an oxidizing catalyst is placed upstream of a filter 4 that traps particulate matters. The catalytic converter 3 oxidizes NO in the exhaust gas into $NO_2$, which in turn burns and removes particulate matters trapped by the filter 4.

17 Claims, 3 Drawing Sheets

PARTICULATE TRAP FOR DIESEL ENGINE

BACKGROUND OF THE INVENTION

1. Field of the Invention

The present invention relates to a particulate trap for trapping and removing particulate matters, such as carbon particles, contained in exhaust gases of diesel engines.

2. Description of the Background Art

Engines that use petroleum-based fuel as their energy source burn fuel to convert heat energy into mechanical energy. Generally, the combustion is incomplete and the exhaust gas contains particulate matter (hereinafter called PM) consisting mainly of carbon particles. If the exhaust gas is emitted without proper treatment, it causes air pollution.

Researchers and engineers have invented many devices that trap and remove PM emitted from diesel engines of cars, for example, filters to prevent air pollution. However, engines emit exhaust gases containing corrosive gases such as sulfur oxides ($SO_x$) with a wide range of temperature. This makes it difficult to select the material of filters. Because PM in an exhaust gas comprises extremely fine particles, there is particular focus on the size of pores in filters.

A cordierite-ceramic foamed body has been developed as a typical filter material. The material has extremely fine pores and hence is advantageous in trapping PM securely. This structure of fine pores requires a large effective trapping surface. To meet this requirement, a honeycomb structure has been used as one of the solutions.

Because cordierite has low thermal conductivity, when a filter is regenerated by burning trapped PM to remove them and allowing the filter to be restored to its original condition, it may cause local heating, posing problems such as cracking or melting.

Another material that has been developed in recent years is a metallic porous body that has a three-dimensional network structure formed of an Fe—Cr—Al, Ni—Cr—Al, or Fe—Ni—Cr—Al-based metal. Having high thermal conductivity, these metallic porous bodies are free from local heating, a drawback of the foregoing cordierite. Consequently, they can be regenerated with equalized temperatures. However, when they are produced with fine pores equivalent to those of a cordierite-ceramic foamed body, they produce extremely heavy filters because of the high specific gravity.

To overcome this disadvantage, various concepts have been disclosed on the structure of a filter using a metallic porous body having a three-dimensional network structure (hereinafter called "a metallic porous body"). A published Japanese patent application Tokukaihei 6-257422 discloses a structure in which two or four concentric cylindrical filter elements formed of a metallic porous body are used together with a heater provided between the filter elements. This structure allows effective combustion and removal of trapped PM and enables equalized regeneration of filters, prolonging the life of filters.

However, when the filters are used continuously in cars, industrial machines, and so on, a plurality of filters must be provided in parallel because while a filter is regenerating, another filter must work to trap PM. In addition, the filter regeneration requires provision of burners or electric heaters for burning PM together with a complex electrical control system for controlling them.

Another published Japanese patent application Tokukaihei 10-159552 discloses a technique that burns, or oxidizes, trapped PM without using a burner or electric heater. This technique uses a catalytic converter in which an oxidizing catalyst is carried by a honeycomb flow-through monolith. The catalytic converter is placed upstream of a filter that traps PM. Hereinafter, in a path for emitting an exhaust gas, the side nearer to the engine is called "the upstream side," and the side farther from the engine "the downstream side." The catalytic converter placed at the upstream side oxidizes NO in the exhaust gas into $NO_2$, which in turn burns PM trapped by the filter.

The device disclosed in Tokukaihei 10-159552 can burn and remove PM trapped by the filter at an exhaust gas temperature of about 250° C. or higher by oxidizing NO in the exhaust gas into $NO_2$. However, driving in ordinary urban districts often result in prolonged idling, during which time the temperature of the exhaust gas is low. If a catalyst carrier has large thermal capacity, prolonged time is needed to heat the catalyst carrier to a temperature at which PM can burn. As a result, the device is unable to burn the trapped PM completely.

Even if the catalytic converter oxidizes NO into $NO_2$, the $NO_2$ sometimes reverts to NO because of the drop in the exhaust gas temperature before the $NO_2$ reacts on the PM accumulated on the filter. This phenomenon reduces the efficiency of the device.

SUMMARY OF THE INVENTION

An object of the present invention is to offer a particulate trap in which one or more metallic porous bodies having less fine pores and smaller thermal capacity per unit volume than a cordierite-ceramic foamed body forms a catalytic converter and a filter. This structure solves the foregoing problems and produces a particulate trap excellent in durability and advantageous in cost.

The present invention uses a catalytic converter in which an oxidizing catalyst is carried on the surface of the framework of one or more metallic porous bodies having an average pore diameter not less than 500 $\mu$m and not more than 2,000 $\mu$m. This catalytic converter is placed upstream of the filter that traps PM. The metallic porous body has larger porosity than a ceramic foamed body, so it can carry a larger amount of catalysts per unit volume. In addition, the metallic porous body has the advantage of large thermal conductivity and small thermal capacity per unit volume.

Consequently, even when the temperature of an exhaust gas rises in a short time while the car is operating, a catalytic converter with a small volume can oxidize NO effectively and burn trapped PM, because the temperature of the catalytic converter can be raised easily. A catalytic converter with an average pore diameter not less than 500 $\mu$m can suppress the reduction in catalytic action resulting from the accumulation of PM. A catalytic converter with an average pore diameter not more than 2,000 $\mu$m can properly maintain the distance between the catalyst carried on the surface of the framework of the catalytic converter and the passing NO molecules, thereby providing sufficient oxidizing reaction for burning PM.

It is desirable that a catalytic converter have a porosity not less than 90% and not more than 98%. The porosity not less than 90% can reduce the thermal capacity per unit volume of the catalytic converter, causing the temperature rise of the catalytic converter in a short time. It is desirable, however, that the porosity be not more than 98% because a porosity exceeding 98% cannot produce sufficient strength.

It is desirable that the catalytic converter carry an oxidizing catalyst having an amount not less than 0.15 grams and not more than 1.5 grams per unit volume of one liter of the catalytic converter (hereinafter merely expressed as g/l). The amount not less than 0.15 g/l can gives sufficient reaction for burning PM. The amount not more than 1.5 g/l is desirable in terms of economic consideration, because the oxidizing reaction shows a saturation tendency when an excessive amount of oxidizing catalysts is given.

It is desirable that the catalytic converter and the filter be formed of a material made of an Fe—Cr—Al, Ni—Cr—Al, or Fe—Ni—Cr—Al-based metallic material, which has small thermal capacity per unit volume. It is also desirable to use the same type (the same composition) of metallic material for forming the catalytic converter and the filter. This is because the catalytic converter and the filter are used under the same conditions, and the use of the same type of material eliminates the need of independent measures for thermal expansion, corrosion, and oxidation.

It is desirable that the filter have an average pore diameter not larger than that of the catalytic converter, because this condition enables effective trapping of PM.

When the catalytic converter and the filter have the same average pore diameter and are formed of the same type of metallic material, it is desirable that material of the filter be compressed uniformly in the direction of the exhaust gas flow so as to achieve a higher compression rate than material of the catalytic converter and to reduce the average pore diameter in the direction of the exhaust gas flow. This structure enables to adapt the same measures for thermal expansion, corrosion, and oxidation, thereby increasing the productivity. Because the catalytic converter and the filter have the same material properties, generation of unwanted thermal stresses can be prevented, so that the durability can be improved.

It is desirable that the gap between the catalytic converter and the filter be not more than two times the thickness of the catalytic converter. The narrow gap can prevent a drop in the exhaust gas temperature, enabling the $NO_2$ produced by oxidation to react on the trapped PM before being reverted to NO. This increases the efficiency of oxidation, or combustion, of PM. The catalytic converter may be placed in contact with the surface of the filter at the upstream side. This reduces the size of the device and improves the stability of quality because no positioning is needed.

It is desirable that an oxidizing catalyst be carried not only by the catalytic converter but also by the filter. This further activates the oxidizing reaction of the trapped PM, thereby suppressing the increase in pressure loss of the filter.

Notwithstanding that in this case, a different type of oxidizing catalyst may be carried by the filter, it is desirable that the filter carry the same type of catalyst as the catalytic converter. This prevents unnecessary catalytic reactions from occurring, thus productivity is improved.

The catalytic converter and the filter may have the same material properties such as an average pore diameter and the type of metal. The unification of the material properties prevents the generation of unwanted thermal stresses, thus improving the durability. The unification also enables the concurrent production of the catalytic converter and the filter, improving the productivity.

Particulate traps may have various shapes and arrangements of the catalytic converter and the filter. FIG. 1 shows a typical arrangement in which a cylindrical catalytic converter and a cylindrical filter are placed coaxially. A catalytic converter 3 and a filter 4 both having a cylindrical form are placed coaxially, and the openings between the two cylindrical elements are sealed by annular end plates 5a and 5b.

With other openings being properly sealed, the exhaust gas emitted from the engine is introduced into the catalytic converter 3 and passes through the filter 4. The cylindrical structure enables the enlargement of the passing area for the exhaust gas in the catalytic converter 3 and the filter 4. This enlargement retards the passing flow of the exhaust gas, suppresses the increase in the pressure loss, and thereby increases the amount of trapped PM.

A catalytic converter and a filter may be arranged differently as shown below.
(a) The catalytic converter is placed inside the filter so that the exhaust gas is introduced from inside (see FIG. 1).
(b) The catalytic converter is placed outside the filter so that the exhaust gas is introduced from outside (see FIG. 2).
When the exhaust gas contains a large amount of PM, it is desirable that the filter have a large trapping area in order to suppress the increase in pressure loss resulting from the accumulation of the trapped PM. That is, the arrangement (a) above is desirable. This arrangement allows the filter at the outside to act as a heat insulation layer, facilitating the temperature rise in the catalytic converter by the heat of the exhaust gas, which is another advantage.

When the exhaust gas does not contain a large amount of PM, it is not necessary to increase the trapping area of the filter. In this case, it is desirable to activate the oxidizing reaction of the catalyst by retarding the flow of the exhaust gas passing through the catalytic converter That is, the arrangement (b) above is desirable Therefore, either of the arrangements (a) and (b) may be selected according to the displacement of the engine, temperature of the exhaust gas, and so on of a car.

A particulate trap may have another structure. FIG. 3 shows an arrangement in which board-shaped metallic porous bodies form a catalytic converter and a filter. Both the catalytic converter and the filter are placed perpendicularly to the flow of the exhaust gas. It is desirable that the catalytic converter 3 and the filter 4 each be formed by laminating a plurality of board-shaped metallic porous bodies. This structure enables the relaxation of the stresses caused by the difference of expansion between metallic porous bodies resulting from the temperature difference of the exhaust gas between the upstream and downstream sides of the catalytic converter 3 or the filter 4.

It is desirable that the board-shaped metallic porous body have a thickness not less than 1.5 mm and not more than 30 mm per board before the lamination. The thickness not less than 1.5 mm protects the metallic porous body from warping at the time of heat treatment. The thickness not more than 30 mm allows the catalytic converter or the filter to carry a catalyst uniformly, thereby activating the oxidizing reaction of the trapped PM, so that the increase in pressure loss in the filter can be suppressed. When Al is added into the metal composition by the diffusion osmosis method in order to improve the durability of the metallic porous body in an exhaust gas, the thickness not more than 30 mm allows the uniform addition of Al into the metal composition, thereby providing the needed durability.

When a catalytic converter and a filter are formed of a plurality of board-shaped metallic porous bodies, it is desirable that the catalytic converter have a total thickness $t_1$ not less than 10D and not more than 80D, where D represents the average pore diameter of the catalytic converter.

The total thickness $t_1$ not less than 10D increases the efficiency of the oxidation of NO contained in the exhaust gas into $NO_2$ and of the combustion of the PM accumulated in the filter in the downstream side. An increase in the total thickness $t_1$ of the catalytic converter increases the amount of reaction from NO to $NO_2$, thereby increasing the efficiency of PM combustion. An increase in the average pore diameter D of the catalytic converter 3 increases the amount of NO passing between catalysts without being oxidized into $NO_2$. Therefore, the increase in the average pore diameter D requires the increase in the thickness.

However, if the catalytic converter is extremely thick, the increased thermal capacity reduces its temperature responsiveness when the temperature of the exhaust gas rises within a short time. Consequently, it is desirable that the catalytic converter have a thickness not more than 80D, so that sufficient efficiency is secured for burning PM without increasing the thermal capacity.

When a catalytic converter and a filter are each formed by laminating a plurality of board-shaped metallic porous bodies, and when the filter carries an oxidizing catalyst at the same time, it is desirable that the total thickness $t_2$ of the catalytic converter and the filter be not less than 18D and not more than 135D, where D represents the average pore diameter of the catalytic converter.

The total thickness $t_2$ not less than 18D secures the oxidizing reaction of NO to $NO_2$ and the PM-trapping performance, increasing the efficiency of trapping and burning of PM. An increase in the thickness of the catalytic converter increases the amount of reaction from NO to $NO_2$, thereby increasing the efficiency of PM combustion. An increase in the total thickness improves the PM-trapping performance.

The total thickness $t_2$ not more than 135D prevents the unwanted increase in the pressure loss caused by the excessive increase in the thickness. This upper limit in the thickness secures the temperature responsiveness in a short time.

It is desirable that a particulate trap have a structure in which a board-shaped catalytic converter and a board-shaped filter are placed in series, that there is space between the catalytic converter and the filter, and the case, and that end plate-sealing be provided at least to the openings between the catalytic converter and the case at the entrance side of the exhaust gas and between the filter and the case at the exit side of the exhaust gas. The catalytic converter and the filter may be in contact with the case with no space between them. This structure is still sufficient to purify an exhaust gas. Nevertheless, when the catalytic converter and the filter have space between them and the case, the space acts as an air heat-insulation layer, suppresses the temperature drop of the exhaust gas passing through the catalytic converter, and thus maintains the effect of PM burning by catalytic reactions.

When a cylindrical catalytic converter and a cylindrical filter are aligned coaxially, the space provided between the catalytic converter or the filter and the case allows the exhaust gas to flow into or flow out of the peripheral surface. Consequently, both the catalytic converter and the filter permit the catalyst to function effectively without regard to the location, enabling effective PM trapping. The space also provides stagnation layers and retards the flow of the exhaust gas, increasing the functioning efficiency of the catalytic converter and the PM-trapping efficiency of the filter.

It is desirable that a case that houses a catalytic converter and a filter have at the downstream side of the filter a silencer in series with the catalytic converter and the filter in the direction of the exhaust gas flow. The housing of a catalytic converter, a filter, and a silencer in one case is advantageous not only in space saving and economic aspects but also in effective burning and removal of PM. This is because the silencer portion has a heat insulation effect and facilitates the temperature rise in the filter portion.

The silencer portion produces stagnation in the flow of the exhaust gas, causing the flow to be slow and uniform as a whole. This enables uniform trapping of PM and uniform regeneration of the filter. This effect is particularly notable with a board-type catalytic converter and a board-type filter, because this type is prone to produce a less uniform distribution of flow in the direction perpendicular to the flow of the exhaust gas.

If an engine emits an exhaust gas having a temperature at which PM can burn, the pressure loss in the filter cannot increase excessively by clogging. As a matter of fact, a diesel engine emits low temperatures exhaust gas. For instance, the exhaust gas has a temperature no higher than 100 to 150° C. at the time of idling. If idling continues for a prolonged time, the clogging of the filter by the trapped PM increases the pressure loss and may stop the engine.

Consequently, to carry out the regeneration of a filter securely and forcibly, it is desirable to provide a means that detects the pressure and temperature of the exhaust gas at specified time intervals or continuously and raises the temperature of the exhaust gas or the filter. Such a means includes an engine control aid, such as for increasing the amount of fuel injection, or a temperature-rising aid using a heat source such as an electric heater. In either means, when the catalytic converter and the filter are formed with one or more metallic porous bodies having small thermal capacity, it is easy to raise the temperature of the catalytic converter and the filter.

Heating control based on the data detected at specified time intervals allows the employment of a simple system that controls the time intervals according to the magnitude of the pressure loss of the filter and the allowable pressure loss of individual engines. However, this method requires more frequent heating than the continuous control method, sometimes posing problems such as an increase in the amount of fuel injection and a reduction in the life of the mounted electrical equipment. Accordingly, to improve the reliability of the system as a whole, it is desirable to select a system that continuously detects the exhaust gas pressure, the exhaust gas temperature and so on to raise the temperature of the exhaust gas or the filter only when the detected data deviates from the established limit.

The particulate trap of the present invention has a catalytic converter placed upstream of a filter that traps PM. The catalytic converter is formed of one or more metallic porous bodies that carry an oxidizing catalyst. The catalytic converter has the advantages of an ability to carry a large amount of catalysts per unit volume, high thermal conductivity, and small thermal capacity per unit volume. As a result, it is easy to raise the temperature of the catalytic converter even when the temperature of the exhaust gas rises in a short time. Therefore, the catalytic converter even with a small volume can both effectively activate the oxidation and burn the trapped PM, thereby suppressing the increase in pressure loss.

The particulate trap of the present invention does not require a heating burner, an electric heater, and a complex electrical control system for those heaters in order to burn and remove the trapped PM. Therefore, the particulate trap is advantageous in energy saving, costs, and maintenance.

DESCRIPTION OF THE PREFERRED EMBODIMENTS

EXAMPLES 1 AND 2

Figure 1:
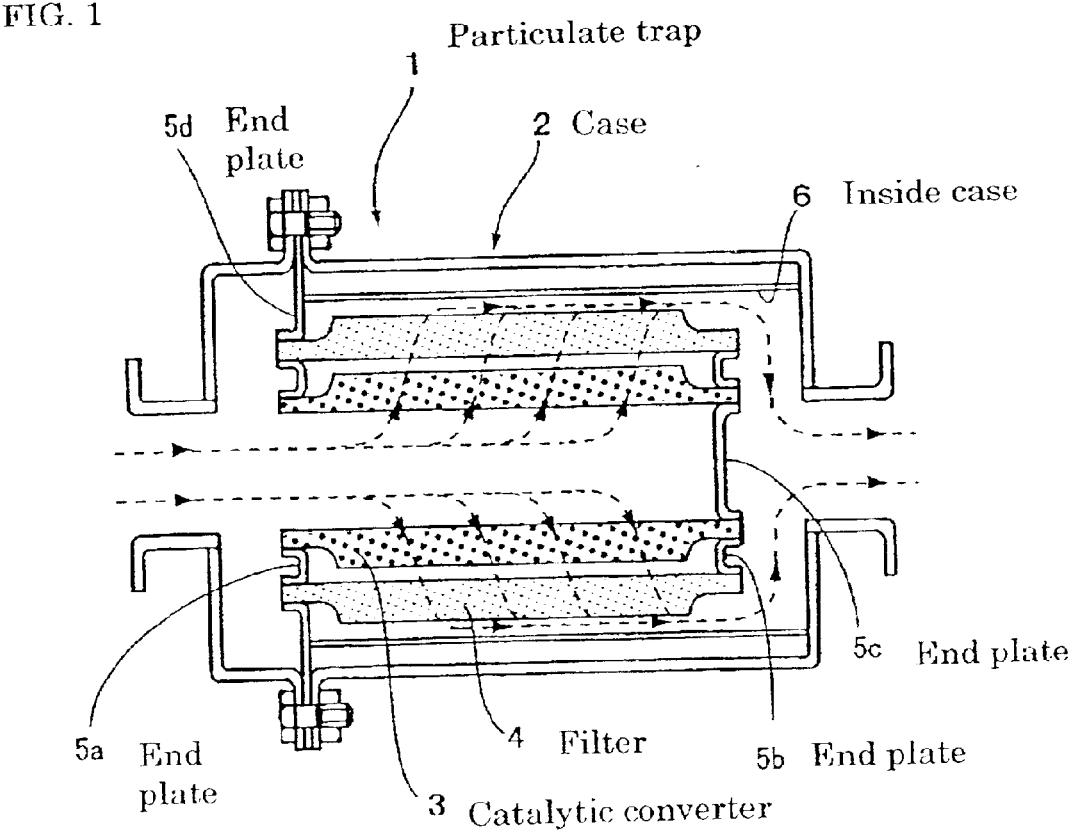
FIG. 1 is a cross-sectional view of the particulate trap for Examples 1 and 4 of the present invention.

FIG. 1 is a cross-sectional view of the particulate trap for Example 1 of the present invention. A particulate trap 1 has a case 2 that houses a cylindrical catalytic converter 3 and a cylindrical filter 4 that has a larger inside diameter than the outside diameter of the cylindrical catalytic converter 3. An annular end plate 5a links the outside perimeter of the catalytic converter 3 and the inside perimeter of the filter 4 at the entrance side for the exhaust gas (shown on the left-hand side in the figure); an annular end plate 5b, at the exit side for the exhaust gas. An end plate 5d seals the opening between the outside perimeter of the filter 4 and the case 2 at the entrance side for the exhaust gas, and an end plate 5c seals the opening formed by the inside perimeter of the catalytic converter 3 at the exit side for the exhaust gas.

The end plate 5d also fixes to the case 2 the catalytic converter 3 and the filter 4 linked by the end plates 5a and 5b. The particulate trap in FIG. 1 has a cylindrical inside case 6 for providing an air heat-insulation layer at the inside perimeter of the case 2.

The exhaust gas flows as indicated by an arrow with dotted lines. The exhaust gas enters the case 2 through the opening at the upstream side, flows from the inside perimeter side of the catalytic converter to the outer perimeter side, causes the filter 4 to trap PM in the exhaust gas, and leaves the case 2 from the opening at the downstream side.

The catalytic converter 3 was formed by using a metallic porous body made by Sumitomo Electric Ind., Ltd. with the brand name "Celmet." Nickel constituting the metallic porous body was converted into an Ni—Cr—Al alloy by alloying treatment. The metallic porous body has an average pore diameter of 1,300 $\mu$m. An oxide substrate consisting mainly of alumina was formed on the framework of the metallic porous body. A platinum (Pt)-based oxidizing catalyst consisting mainly of Pt was carried on the surface of the substrate. To achieve good adhesion between the metallic porous body and the substrate consisting mainly of alumina, it is desirable that the framework have 1 to 15% Al. To improve the heat resistance of the catalyst, it is desirable that the catalyst contain other metals such as rhodium (Rd) and palladium (Pd).

The filter 4 was formed of a metallic porous body made of the same material as that in the catalytic converter 3. The filter 4 has an average pore diameter of 140 $\mu$m. The catalytic converter 3 has a cylindrical form having an outside diameter of 110 mm, a thickness of 12 mm, and a length of 200 mm. The catalytic converter 3 carries a Pt-based catalyst with an amount of 1.5 g/l. The filter 4, placed outside the catalytic converter 3, has an outside diameter of 144 mm, a thickness of 13 mm, and a length of 200 mm. The distance between the catalytic converter 3 and the filter 4 is 4 mm in the radial direction.

Figure 2:
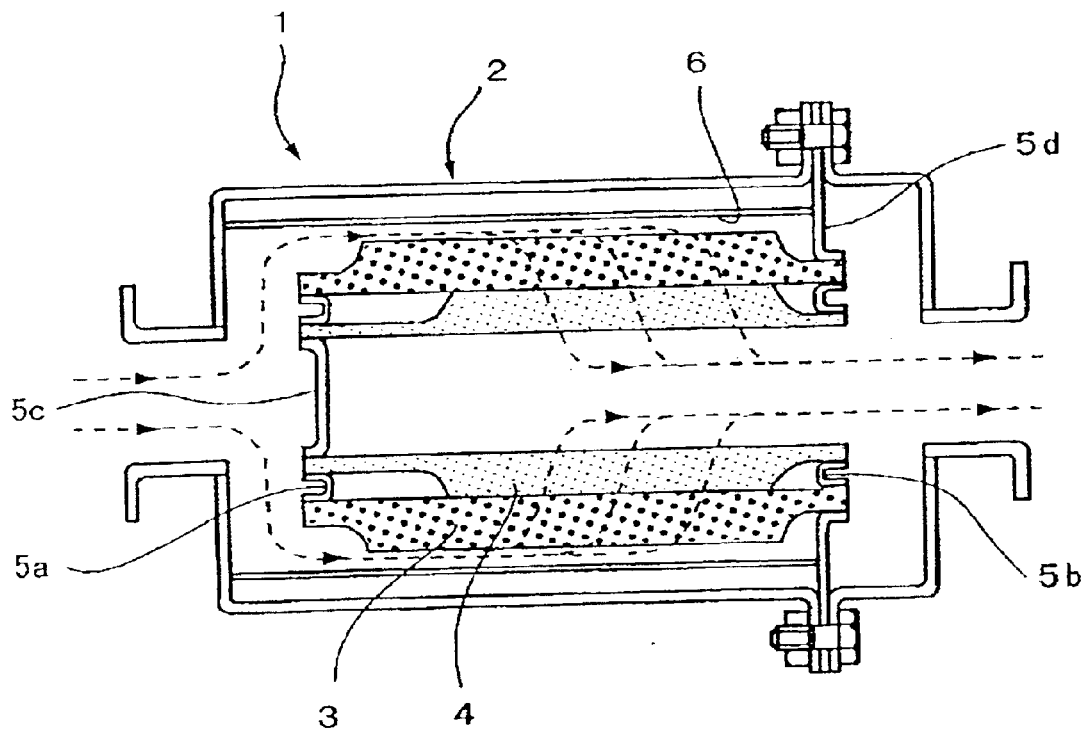
FIG. 2 is a cross-sectional view of the particulate trap for Examples 2 and 3 of the present invention.

FIG. 2 is a cross-sectional view of the particulate trap for Example 2 of the present invention. The catalytic converter 3 has a cylindrical form having an outside diameter of 130 mm, a thickness of 14 mm, and a length of 150 mm. The catalytic converter 3 carries a Pt-based catalyst with an amount of 0.9 g/l. The filter 4, placed inside the catalytic converter 3, has an outside diameter of 102 mm, a thickness of 10 mm, and a length of 120 mm. The catalytic converter 3 and the filter 4 are assembled in contact with each other. The same material as in Example 1 was used. Table 1 shows the dimensions and other items for Examples 1 and 2.

Table 1

|  | Arrangement | Outside diameter (mm) | Thickness (mm) | Length (mm) | Average pore diameter (mm) | Porosity (%) | Amount of carried catalysts (g/l) |
|---|---|---|---|---|---|---|---|
| Example 1 | | | | | | | |
| Catalytic converter | Inside | 110 | 12 | 200 | 1.3 | 96 | 1.5 |
| Filter | Outside | 144 | 13 | 200 | 0.14 | 94 | — |
| Example 2 | | | | | | | |
| Catalytic converter | Outside | 130 | 14 | 150 | 0.6 | 97 | 0.9 |
| Filter | Inside | 102 | 10 | 120 | 0.19 | 95 | — |

In Example 2, the filter 4 placed inside the catalytic converter 3 is shorter than the catalytic converter 3. The reason is that because only a small amount of the exhaust gas passes through the catalytic converter 3 near the end plate 5c, sufficient $NO_2$ cannot be fed for burning PM trapped by the filter 4. The filter 4 is provided with a compressed portion near the end plate 5c so that the exhaust gas hardly flows through this portion.

The particulate trap 1 of Example 1 was installed at midpoint in the down-stream position of the exhaust pipe of an engine having a displacement of 2.8 liters. A PM-trapping experiment was carried out with engine-running conditions of 1,800 rpm and a ¾ load. The temperature of the exhaust gas was about 300° C.

Pressure loss at the start of the experiment was 3 kPa. The pressure loss increased to 4 kPa two hours after the start of PM trapping. Next, another experiment was conducted with a particulate trap in which the catalytic converter 3 shown in FIG. 1 was dismounted under the other conditions unchanged. The pressure loss increased to 9 kPa two hours after the start of PM trapping.

Then, the particulate trap 1 of Example 2 was used to carry out PM-trapping experiments using the same engine and fuel under the same condition as in the experiments of Example 1. The initial pressure loss was 3 kPa. The pressure loss increased to 5 kPa two hours after the start of PM trapping. When the catalytic converter 3 was dismounted as in-Example 1, the pressure loss increased to 21 kPa two hours after the start of PM trapping.

The experimental results of Examples 1 and 2 demonstrated that the installation of the catalytic converter 3 enables the suppression of the increase in pressure loss by burning PM trapped by the filter 4. In particular, Example 2 showed that the installation of the catalytic converter 3 suppresses the increase in pressure loss significantly. More specifically, the catalytic converter 3 decreased the pressure loss to about ¼ of the pressure loss produced when no catalytic converter was used.

EXAMPLES 3 AND 4

Example 3 of the present invention has the structure as shown in FIG. 2. Both the catalytic converter 3 and the filter 4 were formed of a metallic porous body, made of Ni—Cr—Al alloy, having an average pore diameter of 500 μm. The filter 4 was compressed with a compression rate of 50% in the direction of thickness, so that the average pore diameter was reduced in the flow direction of the exhaust gas.

Example 4 of the present invention has the structure as shown in FIG. 1. The catalytic converter 3 was formed of a metallic porous body made of Ni—Cr—Al alloy. The filter 4 was formed of a metallic porous body made of Fe—Cr—Al alloy. The filter 4 was compressed with a compression rate of 93% in the direction of thickness, so that the average pore diameter was reduced in the flow direction of the exhaust gas. The increase in the compression rate of the filter 4 reduces the pore diameter of the metallic porous body, causing the filter 4 to accumulate considerable amounts of PM. When the considerable amounts of PM burn at the same time, the temperature of the filter 4 rises drastically. Therefore, the filter 4 was formed of the material having high resistance to heat. Table 2 shows the dimensions and other items for Examples 3 and 4.

In Example 3, pressure loss at the start of the experiment was 3 kPa. The pressure loss increased to 9 kPa two hours after the start of PM trapping. Next, the catalytic converter 3 shown in FIG. 2 was dismounted to carry out another experiment, the other conditions under which were unchanged. The pressure loss increased to 18 kPa two hours after the start of PM trapping.

In Example 4, the initial pressure loss was 3 kPa. The pressure loss increased to 8 kPa two hours after the start of PM trapping. When the catalytic converter 3 was dismounted as in Example 1, the pressure loss increased to 35 kPa two hours after the start of PM trapping.

The experimental results of Examples 3 and 4 demonstrated that the installation of the catalytic converter 3 enables the suppression of the increase in pressure loss by burning PM trapped by the filter 4. In particular, Example 4 showed that the installation of the catalytic converter 3 suppresses the increase in pressure loss significantly. More specifically, the catalytic converter 3 decreased the pressure loss to about ¼ of the pressure loss produced when no catalytic converter was used.

EXAMPLES 5 AND 6

Figure 3:
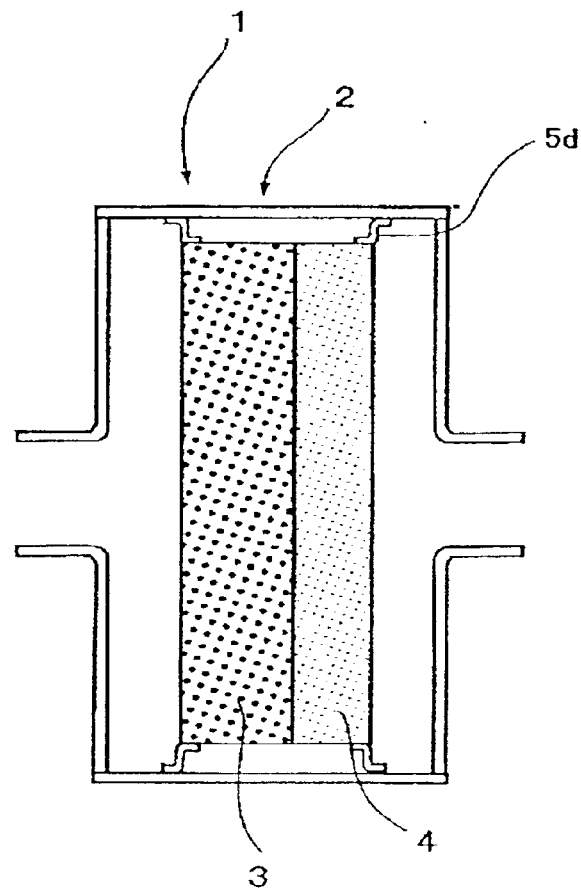
FIG. 3 is a cross-sectional view of the particulate trap for Example 5 of the present invention.

FIG. 3 is a cross-sectional view of the particulate trap for Example 5 of the present invention. Both the catalytic converter 3 and the filter 4 were formed of a disk-shaped metallic porous body. The catalytic converter 3 placed at the upstream side was formed of a metallic porous body with an average pore diameter of 800 μm. The filter 4 placed at the downstream side was formed of a metallic porous body with an average pore diameter of 200 μm. The catalytic converter 3 has a thickness of 25 mm and a diameter of 396 mm. The filter 4 has a thickness of 19 mm and a diameter of 396 mm.

Figure 4:
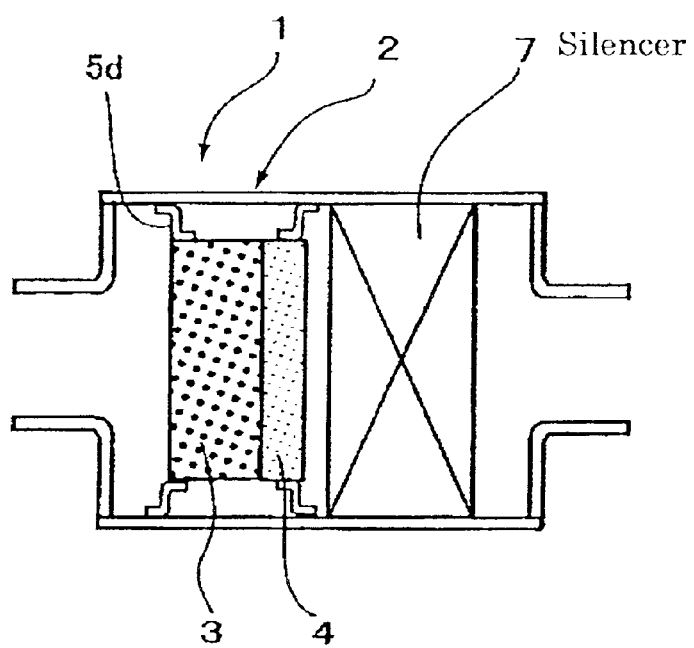
FIG. 4 is a cross-sectional view of the particulate trap for Example 6 of the present invention.

FIG. 4 is a cross-sectional view of the particulate trap for Example 6 of the present invention. Both the catalytic converter 3 and the filter 4 are disk shaped as in Example 5. The catalytic converter 3 placed at the upstream side was formed of a metallic porous body with an average pore diameter of 1,500 μm. The filter 4 placed at the downstream side was formed of a metallic porous body with an average pore diameter of 400 μm. The thickness of the catalytic converter 3 is 40 mm and the diameter is 170 mm. The thickness of the filter 4 is 15 mm and the diameter is 170 mm. A silencer 7 was placed downstream of the filter 4 in the case 2.

TABLE 2

| | Arrangement | Outside diameter (mm) | Thickness (mm) | Length (mm) | Average pore diameter (mm) | Porosity (%) | Amount of carried catalysts (g/l) |
| --- | --- | --- | --- | --- | --- | --- | --- |
| Example 3 | | | | | | | |
| Catalytic converter | Inside | 130 | 14 | 150 | 0.5 | 97 | 0.2 |
| Filter | Outside | 102 | 10 | 120 | 0.25 | 94 | — |
| Example 4 | | | | | | | |
| Catalytic converter | Outside | 110 | 12 | 200 | 1.3 | 96 | 0.9 |
| Filter | Inside | 144 | 13 | 200 | 0.09 | 92 | — |

The particulate traps 1 of Examples 3 and 4 were used to carry out PM-trapping experiments using the same engine and fuel under the same condition as in the experiments of Examples 1 and 2.

In Examples 5 and 6, the catalytic converter 3 and the filter 4 were placed in contact with each other. However, they may be placed apart on condition that the distance between them is not more than two times the thickness of the catalytic converter, because this condition can prevent a reduction in temperature of the exhaust gas. Table 3 shows the dimensions and other items of Examples 5 and 6.

TABLE 3

|  |  | Diameter (mm) | Thickness (mm) | Average pore diameter (mm) | Porosity (%) | Amount of Carried catalysts (g/l) |
|---|---|---|---|---|---|---|
| Example 5 | Catalytic converter | 396 | 25 | 0.8 | 93 | 1.3 |
|  | Filter | 396 | 19 | 0.2 | 92 | — |
| Example 6 | Catalytic converter | 170 | 40 | 1.5 | 96 | 1.0 |
|  | Filter | 170 | 15 | 0.4 | 96 | — |

The particulate traps 1 of Examples 5 and 6 were used to carry out PM-trapping experiments using the same engine and fuel under the same condition as in the experiments of Examples 1 to 4.

In Example 5, pressure loss at the start of the experiment was 2 kPa. The pressure loss increased to 3 kPa two hours after the start of PM trapping. Next, the catalytic converter 3 shown in FIG. 3 was dismounted to carry out another experiment, the other conditions under which were unchanged. The pressure loss increased to 7 kPa two hours after the start of PM trapping.

In Example 6, the initial pressure loss was 8 kPa. The pressure loss increased to 10 kPa two hours after the start of PM trapping. Next, another experiment was conducted with the catalytic converter 3 shown in FIG. 4 being dismounted, the other conditions under which were unchanged. The pressure loss increased to 26 kPa two hours after the start of PM trapping.

The experimental results of Examples 5 and 6 demonstrated that the installation of the catalytic converter 3 enables the suppression of the increase in pressure loss by burning PM trapped by the filter 4. In particular, Example 6 showed that the installation of the catalytic converter 3 suppresses the increase in pressure loss significantly. More specifically, the catalytic converter 3 decreased the pressure loss to about ⅓ of the pressure loss produced when no catalytic converter was used.

EXAMPLES 7 TO 10

Figure 5:
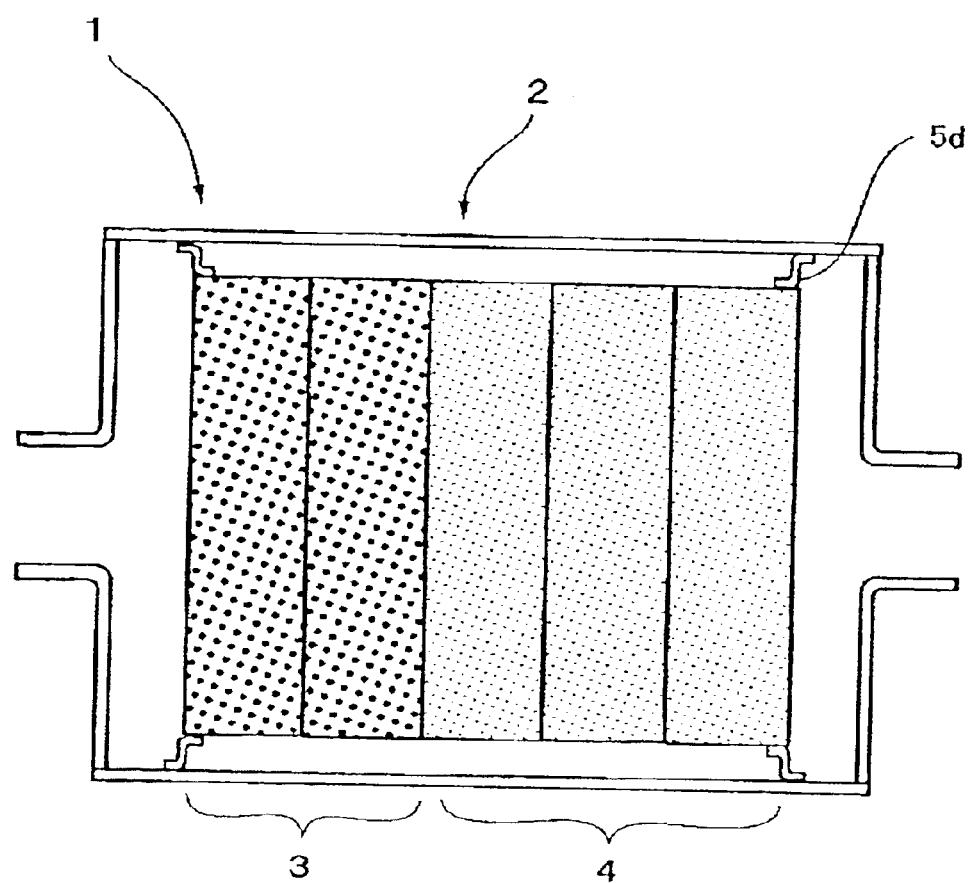
FIG. 5 is a cross-sectional view of the particulate trap for Example 7 of the present invention.

FIG. 5 is a cross-sectional view of the particulate trap for Example 7 of the present invention. Both the catalytic converter 3 and the filter 4 were formed of disk-shaped metallic porous bodies with an average pore diameter of 1,900 μm. The thickness of the catalytic converter 3 is 60 mm (30 mm×2 sheets) and the diameter is 340 mm. The thickness of the filter 4 is 90 mm (30 mm×3 sheets) and the diameter is 340 mm. The filter 4 also carries a Pt-based oxidizing catalyst, the same catalyst as the one carried by the catalytic converter 3.

Example 8 of the present invention has a similar structure as in Example 7. Both the catalytic converter 3 and the filter 4 were formed of disk-shaped metallic porous bodies with an average pore diameter of 1,900 μm. The thickness of the catalytic converter 3 is 40 mm (10 mm×4 sheets) and the diameter is 175 mm. The thickness of the filter 4 is 60 mm (10 mm×6 sheets) and the diameter is 175 mm. The filter 4 also carries a Pt-based oxidizing catalyst, the same catalyst as the one carried by the catalytic converter 3.

Example 9 of the present invention has a similar structure as in Example 7. Both the catalytic converter 3 and the filter 4 were formed of disk-shaped metallic porous bodies with an average pore diameter of 1,300 μm. The thickness of the catalytic converter 3 is 30 mm (10 mm×3 sheets) and the diameter is 300 mm. The thickness of the filter 4 is 50 mm (5 mm×10 sheets) and the diameter is 300 mm. The filter 4 also carries a Pt-Pd-based oxidizing catalyst, the same catalyst as the one carried by the catalytic converter 3.

Example 10 of the present invention has a similar structure as in Example 7. Both the catalytic converter 3 and the filter 4 were formed of disk-shaped metallic porous bodies with an average pore diameter of 500 μm. The thickness of the catalytic converter 3 is 15 mm (5 mm×3 sheets) and the diameter is 100 mm. The thickness of the filter 4 is 35 mm (5 mm×7 sheets) and the diameter is 100 mm. The catalytic converter 3 carries a Pt-based oxidizing catalyst, and the filter 4 a Pt-Pd-based oxidizing catalyst.

In Examples 7 to 10, the disk-shaped metallic porous bodies were placed in contact with one another. Although the catalytic converter 3 and the filter 4, also, were placed in contact with each other, they may be placed apart. Table 4 shows the dimensions and other items of Examples 7 to 10.

TABLE 4

|  |  | Thickness | | | | | |
|---|---|---|---|---|---|---|---|
|  | Diameter (mm) | Per sheet (mm) | Number of sheets | Total (mm) | Average pore diameter (mm) | Porosity (%) | Basis of carried catalyst |
| Example 7 | | | | | | | |
| Catalytic converter | 340 | 30 | 2 | 60 | 1.9 | 96 | Pt |
| Filter | 340 | 30 | 3 | 90 | 1.9 | 96 | Pt |
| Example 8 | | | | | | | |
| Catalytic converter | 175 | 10 | 4 | 40 | 1.9 | 96 | Pt |

TABLE 4-continued

|  | Diameter (mm) | Thickness | | | Average pore diameter (mm) | Porosity (%) | Basis of carried catalyst |
|---|---|---|---|---|---|---|---|
|  |  | Per sheet (mm) | Number of sheets | Total (mm) |  |  |  |
| Filter Example 9 | 175 | 10 | 6 | 60 | 1.9 | 94 | Pt |
| Catalytic converter | 300 | 10 | 3 | 30 | 1.3 | 95 | Pt-Pd |
| Filter Example 10 | 300 | 5 | 10 | 50 | 1.3 | 95 | Pt-Pd |
| Catalytic converter | 100 | 5 | 3 | 15 | 0.5 | 97 | Pt |
| Filter | 100 | 5 | 7 | 35 | 0.5 | 96 | Pt-Pd |

The particulate traps 1 of Examples 7 to 10 were used to carry out PM-trapping experiments using the same engine and fuel as in the experiments of Examples 1 to 6 under engine-running conditions of 2,400 rpm and full load at an exhaust gas temperature of 460° C. Comparison was made between the pressure loss when the catalyst was carried by the filter 4 and the pressure loss when no catalyst was carried by the filter 4.

In Example 7, pressure loss at the start of the experiment was 1.5 kPa. The pressure loss increased to 2 kPa two hours after the start of PM trapping. Next, the filter 4 shown in FIG. 5 carrying no catalyst was used to carry out another experiment, the other conditions under which were unchanged. The pressure loss increased to 3 kPa two hours after the start of PM trapping.

In Example 8, pressure loss at the start of the experiment was 3 kPa. The pressure loss increased to 4 kPa 2 hours after the start of PM trapping. Next, as with Example 7, the filter 4 carrying no catalyst was used to carry out another experiment, the other conditions under which were unchanged. The pressure loss increased to 6 kPa two hours after the start of PM trapping.

In Example 9, pressure loss at the start of the experiment was 3 kPa. The pressure loss increased to 5 kPa two hours after the start of PM trapping. Next, as with Example 7, the filter 4 carrying no catalyst was used to carry out another experiment, the other conditions under which were unchanged. The pressure loss increased to 6 kPa two hours after the PM trapping.

In Example 10, pressure loss at the start of the experiment was 19 kPa. The pressure loss increased to 28 kPa two hours after the start of PM trapping. Next, as with Example 7, the filter 4 carrying no catalyst was used to carry out another experiment, the other conditions under which were unchanged. The pressure loss increased to 43 kPa two hours after the start of PM trapping.

All the experimental results of Examples 7 to 10 demonstrated that the oxidizing catalyst carried by the filter 4 enables the suppression of the increase in pressure loss by activating the oxidizing reaction of the trapped PM. In particular, Example 10 showed that significant suppression can be accomplished under such severe experimental conditions as a small filter diameter and a small average pore diameter that increase the initial pressure loss.

All Examples described above use one or more metallic porous bodies for forming the filter. Nonetheless, a nonwoven fabric made of silicon carbide may be used for the filter 4 in the structure shown in FIG. 1. A monolith-type filter made of silicon carbide, also, may be used for the filter 4 in the structure shown in FIG. 3.

What is claimed is:

1. A particulate trap for use in diesel engines to be installed in a path of exhaust gas from a diesel engine, the trap comprising:
    a filter for trapping particulate matter (PM);
    a catalytic converter upstream of the filter, the catalytic converter formed of one or more metallic porous bodies each having a three-dimensional network with an average pore diameter not less than 500 μm and not more than 2,000 μm, and an oxidizing catalyst; and
    a case that houses the filter and the catalytic converter.

2. A particulate trap for use in diesel engines as recited in claim 1, wherein the catalytic converter has a porosity not less than 90% and not more than 98%.

3. A particulate trap for use in diesel engines as recited in claim 1, wherein the catalyst is an amount not less than 0.15 grams and not more than 1.5 grams per unit volume of one liter of the catalytic converter.

4. A particulate trap for use in diesel engines as recited in claim 1, wherein the catalytic converter and the filter are formed of the same type of metallic material.

5. A particulate trap for use in diesel engines as recited in claim 1, wherein the filter has an average pore diameter not larger than that of the catalytic converter.

6. A particulate trap for use in diesel engines as recited in claim 5, structured such that material of the filter is compressed uniformly in the direction of the exhaust gas flow, with a higher compression rate than material of the catalytic converter.

7. The particulate trap for use in diesel engines as recited in claim 1, wherein the catalytic converter and the filter are placed apart, the distance between them being not more than two times the thickness of the catalytic converter.

8. A particulate trap for use in diesel engines as defined in claim 1, wherein the filter carries an oxidizing catalyst.

9. A particulate trap for use in diesel engines as recited in claim 8, wherein the catalytic converter and the filter carry the same type of oxidizing catalyst.

10. A particulate trap for use in diesel engines as recited in claim 8, wherein the catalytic converter and the filter have the same average pore diameter.

11. A particulate trap for use in diesel engines as recited in claim 1, wherein:
    the catalytic converter and the filter are cylindrical and aligned coaxially;
    the catalytic converter and the filter having openings therebetween sealed by annular end plates; and wherein an exhaust gas is introduced from the path into the catalytic converter and thereafter through the filter.

12. A particulate trap for use in diesel engines as recited in claim 1, wherein the catalytic converter and the filter are formed by laminating a plurality of board-shaped metallic porous bodies.

13. A particulate trap for use in diesel engines as recited in claim 12, wherein the thickness of each of the board-shaped metallic porous bodies is not less than 1.5 mm and not more than 30 mm.

14. A particulate trap for use in diesel engines as recited in claim 12, wherein the catalytic converter has a total thickness $t_1$ not less than 10D and not more than 80D, where D represents the average pore diameter of the catalytic converter.

15. A particulate trap for use in diesel engines as recited in claim 12, wherein:

the filter carries a catalyst; and the total thickness $t_2$ of the catalytic converter and the filter is not less than 18D and not more than 135D, where D represents the average pore diameter of the catalytic converter.

16. A particulate trap for use in diesel engines as recited in claim 1, wherein there is a space between the catalytic converter and the filter, and the case.

17. A diesel engine-use particulate trap as recited in claim 1, wherein a silencer is provided:

in the case;

in series with the catalytic converter and the filter and downstream of the filter in the flow direction of the exhaust gas.

* * * * *